United States Patent [19]

Pelstring et al.

[11] Patent Number: 5,548,458
[45] Date of Patent: Aug. 20, 1996

[54] SUPPORT FLANGE HAVING ELECTRICAL CONTACTS TO PROVIDE ELECTRICAL CONTINUITY UPON SPINDLE MOTOR MOUNTING TO BASE

[75] Inventors: Robert M. Pelstring, Santa Cruz; Klaus D. Kloeppel, Watsonville; John C. Dunfield, Santa Cruz; Michael K. Andrews, Soquel; Clifford T. Jue, Santa Cruz, all of Calif.

[73] Assignee: Seagate Technology, Inc., Scotts Valley, Calif.

[21] Appl. No.: 238,638

[22] Filed: May 4, 1994

[51] Int. Cl.⁶ .................................................. G11B 17/02
[52] U.S. Cl. ................................................. 360/99.08
[58] Field of Search .......................... 360/99.08; 310/71, 310/67 R, 268, DIG. 3; 439/22, 27, 39, 335, 675; 369/266

[56] References Cited

U.S. PATENT DOCUMENTS

| | | | |
|---|---|---|---|
| 3,521,216 | 6/1968 | Tolegian | 439/675 |
| 4,689,023 | 8/1987 | Strong, III et al. | 310/71 |
| 4,847,712 | 7/1989 | Crapo | 360/99.08 |
| 4,855,849 | 8/1989 | Jones et al. | 360/97.01 |
| 4,965,684 | 10/1990 | Stefansky | 360/78.12 |
| 5,173,053 | 12/1992 | Swanson et al. | 439/22 |
| 5,216,557 | 6/1993 | Elsaesser et al. | 360/99.08 |
| 5,315,465 | 5/1994 | Blanks | 360/105 |
| 5,333,079 | 7/1994 | Takegami et al. | 360/99.08 |

FOREIGN PATENT DOCUMENTS 6-30542  2/1994  Japan .......................... 310/71

OTHER PUBLICATIONS

Article: "Elastomeric", Elastomeric Technologies, Incorporated, 1992.

Primary Examiner—Stuart S. Levy
Assistant Examiner—Kevin M. Watkins
Attorney, Agent, or Firm—LaRiviere, Grubman & Payne

[57] ABSTRACT

Spindle motor electrical- and motor-to-base interfaces. A compliant connector along with a circuit on a support flange is provided below a stator assembly for providing: An insertable spindle motor to drive base with less specific orientation. The support flange may comprise a small printed circuit cable or a printed circuit board. Additionally, non-specific orientation of a spindle motor to drive base assembly is described using circular traces oriented about a support flange. A circular connector is also described, as well as a biased support flange.

1 Claim, 12 Drawing Sheets

SUPPORT FLANGE HAVING ELECTRICAL CONTACTS TO PROVIDE ELECTRICAL CONTINUITY UPON SPINDLE MOTOR MOUNTING TO BASE

TECHNICAL FIELD

The present invention generally relates to assembly and manufacture of disc drives. The present invention is directed to spindle motor-to-base assembly for hard disc drives. In particular, the present invention is directed to winding termination, electrical interface, and mechanical interface of a spindle motor.

BACKGROUND ART

A hard disc drive typically comprises one or more discs connected to a spindle ("rotor") driven by a motor ("spindle motor"). The spindle motor is for providing angular velocity to the discs ("disc pack") attached to the rotor. Read/write heads are positioned relative to the discs ("platters") for storing and/or retrieving information.

To mitigate problems due to contamination, the hard disc drive is sealed in a housing. This "sealed" volume of the hard disc drive, referred to as a drive volume, is bounded on one side by a drive base.

Electrical components disposed on a printed circuit board (PCB) known as a driver board are coupled to the spindle motor by way of electrical connections. The driver board is typically located external to the drive volume, so that the electrical connections must lead into and out of the drive volume.

In rotating shaft spindle motors, a rotor shaft rotates with a rotor hub or cup. In the past, this configuration presented many problems for the manufacture of hard disc drives. To alleviate some of the problems associated with rotating shaft motors, it would be desirable to provide:

1. A spindle motor assembly process which relieves tight tolerances associated with end turns of the motor.
2. A spindle motor assembly process where electrical interface connections do not interfere with motor operation.
3. A spindle motor-to-base assembly process with less specific or non-specific orientation of the spindle motor to the base.
4. A spindle motor assembly process which requires less manual labor.
5. A spindle motor assembly process which reduces costs associated with the printed circuit cable (PCC), including part purchase, assembly, damage and rework costs.

A stationary shaft motor configuration (not shown) is a motor in which the rotor shaft does not rotate with and as part of the rotor. Some of the problems associated with rotating shaft motors have been addressed in stationary shaft motor designs. Such stationary shaft motor designs include:

1. Installation of a PCC to a base prior to mounting a motor. In this approach, electrical contact between the motor and the PCC occurs with physical assembly. This approach is hereinafter referred to as "approach one."
2. Potting of a PCB into a stator inner diameter. In this approach, an elastomeric connector is electrically connected to the PCB. The connector, mounted through the base, is in contact with driver board pads. This approach is hereinafter referred to as "approach two."
3. Assembling a motor in a base. In this approach, a PCB is mounted to the base. An elastomeric connector is mounted through the base to driver board pads. This approach is hereinafter referred to as "approach three."

All of these stationary shaft motor applications include compliant connectors, mitigate end turn sizing problems, and reduce PCC costs. Approaches two and three provide a circuit between the motor and driver board upon mechanical contact. Approach one utilizes a stationary shaft in-hub motor. In approach one, discs are installed onto a spindle prior to motor-to- base assembly.

DISCLOSURE OF INVENTION

In accordance with the present invention, there is provided a hard disc drive having a drive base, a spindle motor, and a driver board, and having improved spindle motor-to-base electrical and mechanical interfaces. This is accomplished by use of a flange that includes a circuit. By the term circuit is meant a path providing electrical continuity between two points. The flange and circuit are attached to and located under the spindle motor. The circuit includes contact surfaces for electrical continuity between stator windings of the spindle motor and contacts of a connector mounted in the base. The connector, mounted in and extending through the base, is located under the spindle motor. Connector contacts may then be connected to a driver board or other circuitry means for driving the spindle motor.

The flange is attached to the outer diameter of a stator sleeve or directly to a stator assembly, e.g., the lower periphery of stator windings ("end turns"). This attachment may be made by any suitable method such as bonding, staking, or the like. Bonding the flange to end turns may result in less deflection of the circuit, and may improve end turn sizing requirements.

The flange and circuit may be made as one integral PCB or as separate components, such as a plastic disc and a PCC. The flange may also be made as a molded part, if desired. If the flange is molded, the circuit may be plated and then etched on the flange, or the flange may be plated with a pattern for forming the circuit. In the case of plating a pattern onto the molded flange, the step of etching is avoided. Alternatively, the conductive elements which form the circuit may be located in place, and then a plastic or other suitable material is poured around the conductive elements to form an "overmolded" flange. With an overmolded or molded flange, tighter tolerances on interface dimensions are possible. Accordingly, a molded or overmolded flange may be attached to the outer diameter of a stator sleeve by means of a press fit. In the case of a press fit, a tolerance ring may be used for flange-to-stator sleeve assembly. Moreover, the flange may be biased in its attachment to the outer diameter of the stator sleeve for improving and maintaining electrical contact.

The circuit may comprise traces or pads or a combination thereof. Electrical contact between the traces and pads may be either through or around the thickness of the flange. The pads may be disposed on the topside of the flange and the traces on the bottom side of the flange. This allows for specific orientation of the motor to the flange, and less specific or non-specific orientation of the flange to the connector. Alternatively, pads may be disposed on both the underside and the topside of the flange for specific orientation to both motor and connector. Or, traces may be disposed on both underside and topside of the flange for less specific or non-specific orientation to both motor and connector.

By non-specific orientation, it is meant that connector contact may be oriented anywhere about 360 degrees with respect to the spindle motor. Non-specific orientation may be facilitated with circular traces. By less specific orientation, it is meant that connector contact may be achieved within a predetermined angular range, but at orientations outside such a range, electrical contact cannot be provided. Thus, less specific orientation may be provided with traces having the shape of arcuate segments.

In accordance with the present invention, a connector is located through and in a drive base under a portion of a support flange in near proximity to a mounting location of a spindle motor. By mechanical contact due to assembly, conductive elements of the connector are put in electrical continuity with the circuit. Thus, mechanical contact owing to assembly of the spindle motor-to-base may be used to provide electrical continuity into and out of a drive volume in accordance with the present invention.

The conductive elements of the connector may include button contacts, elastomeric conductive elements, or springs. However, other connector conductive elements may be used in accordance with the present invention. Notably, button contacts are preferred due to lower compression forces needed, as compared to elastomeric conductive elements, for maintaining electrical contact.

In accordance with the present invention, The connector may be made as a cylindrical connector. The cylindrical connector allows the drive volume to be sealed with a press (interference) fit, as opposed to applying a separate seal or sealing with adhesives. Optionally, adhesive may be used with the cylindrical connector to seal the drive volume.

Assembly of a hard disc drive in accordance with the present invention does not require extensive routing of a PCC, which significantly reduces assembly costs. When applying the principles of the present invention to rotating shaft motors, discs may be installed onto a spindle motor prior to installation of the spindle motor to the drive base and rotation of the hub cannot contact the circuit. Less specific and/or non-specific orientation facilitates this assembly process. For additional ease of assembly, solder pads may be disposed outside an outer diameter of stator laminations. This allows easier access to solder lead wires from the stator windings to the solder pads on the topside of the flange. Moreover, soldering may then be accomplished manually or in automated fashion.

While reduced labor assembly costs follow from the present invention, it is important to note that part costs, owing to a shorter PCC, may also be reduced. Also, importantly, PCBs and plated circuits may be less expensive than PCCs. Thus, for example, the ability to use a PCB instead of a PCC is a possible cost reduction.

End turn sizing is reduced or eliminated with the present invention. With the present invention, there is less criticality in the lengthwise outer dimension of stator windings. Thus, a standard winding for a stator assembly will result in usable product without continuous measurement and adjustment therefor.

In the preferred embodiment of the present invention, the flange is bonded to end turns of the stator assembly. Furthermore, the flange according to the present invention may be made to have an outer diameter smaller than the rotor inner diameter. This will further ensure no interference between the flange and operation of the spindle motor rotor.

Other features of the present invention are disclosed or apparent in the section entitled: "BEST MODE FOR CARRYING OUT THE INVENTION."

BRIEF DESCRIPTION OF DRAWINGS

For fuller understanding of the present invention, reference is made to the accompanying drawing in the following detailed description of the Best Mode of Carrying Out the Invention. In the drawings.

Figure 1:
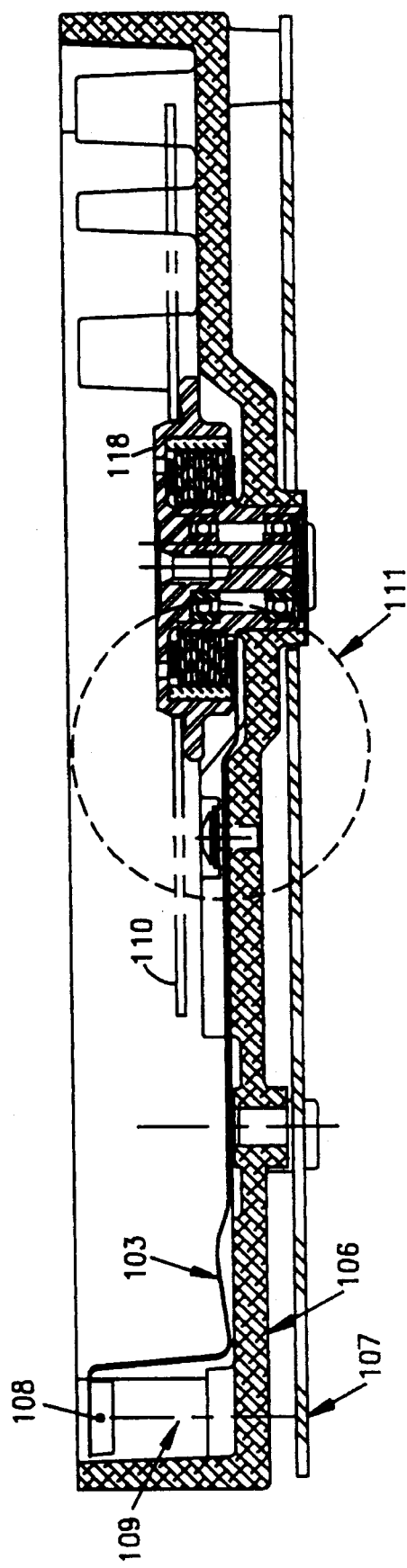
FIG. 1 is a cross-section of a portion of a prior art hard disc drive volume using an extensive PCC.

Reference numbers refer to the same or equivalent parts of the present invention throughout the several figures of the drawing.

BEST MODE FOR CARRYING OUT THE PRESENT INVENTION

In accordance with the present invention, several embodiments are provided for electrical coupling of motor windings to driver circuitry external to a hard disc drive volume. After review of the several embodiments, it should be understood that a flange having printed circuits (a "circuited flange") may be attached to a motor. The motor may be of a stationary or rotating shaft configuration. The circuited flange may be attached to stator end turns or the outer diameter of a stator sleeve. This combination of motor and circuited flange may then be attached to a connector assembled through a base casting. Assembly of the two portions (motor and circuited flange, and connector and base) may be accomplished with specific, less specific, or non-specific orientation as described above.

Background

Prior to a discussion of the embodiments of the present invention, a more detailed understanding of the background art of rotating shaft motors is appropriate. A prior art rotating shaft motor for a hard disc drive is shown in FIG. 1. As shown, a PCC 103 is routed under a disc 110 and through an area containing a voice coil motor (not shown) and an E-block (not shown) to a connector 108. An interconnect system 109 is provided for electrically connecting connector 108 to the driver PCB 107 through a base casting 106.

Figure 3:
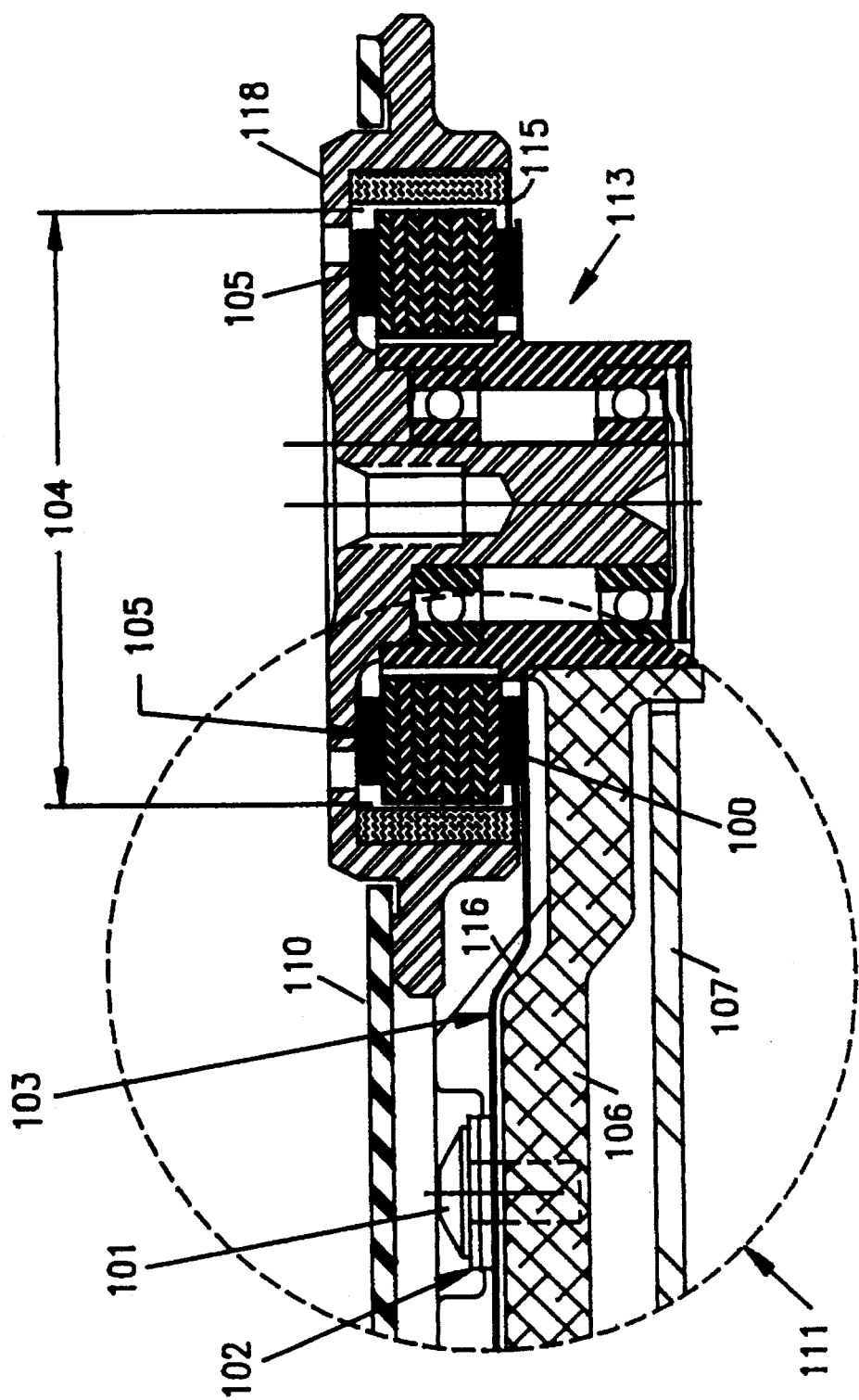
FIG. 3 is a cross-section of an enlarged portion of the hard disc drive volume of FIG. 1.

Referring to FIG. 3 taken in conjunction with FIG. 1, an enlarged view of area 111 is provided. As shown, hold-down clip 102 and machine screw 101 are used to attach PCC 103 to base 106. Solder pads 100 are located within the outer diameter 104 of stator teeth for connection to coils 105 with wires (not shown).

Figure 2:
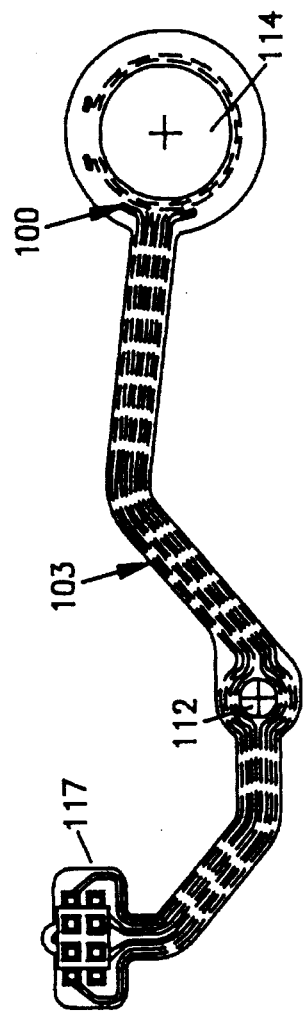
FIG. 2 is a top view of the prior art PCC of FIG. 1.

Referring now to FIG. 2 with continuing reference to FIG. 3, PCC 103 is shown. Spindle motor 113 is located through hole 114 provided in the PCC 103. PCC 103 is routed under disc 110 and fastened to base 106. Screw 101 is located through hole 112 for fastening PCC 103 to base 106. PCC 103 is routed under motor hub 115, up ramp 116, under disc 110, around the actuator cartridge (not shown), and folded over interconnect system 109 (shown in FIG. 1). PCC 103 is then tacked down with adhesive, machine screw 101, and clip 102 to base casting 106 to prevent interference with operation of spindle motor 113. PCC 103 is connected to connector 108 (shown in FIG. 1) with end 117 for electrical coupling with interconnect system 109 (shown in FIG. 1).

Due to tolerance limitations between hub 115 and base 106, PCC 103 had to be precisely located axially to avoid interference with operation of spindle motor 113. Therefore, as coils 105 were created by wrapping wire around a stator laminated core, end turns, arising therefrom, had to be compacted. A tight tolerance on end turn sizing resulted to ensure PCC 103 did not interfere with operation of rotor 118 and with mounting of spindle motor 113 to base 106.

In the past, PCC 103 was very costly to make and install. The great distance over which the PCC 103 travels increases assembly cost of the spindle motor 113 to the base 106. Also, PCC 103 had to be precisely located and attached to base 106 to avoid interfering with operation of rotor 118.

Still another problem with the PCC used heretofore is the specific orientation requirements with respect to the spindle motor 113. As shown, solder pads 100 are carefully located to register with the stators of spindle motor 113. Therefore, spindle motor 113 and PCC 103 had to be oriented to one another in a specific manner.

Preferred Embodiment

The present invention provides a spindle motor having a PCB made into the form of a disc. The stator windings are attached on one side of the PCB (the PCB is attached to stator end turns), and the other side of the PCB has exposed circular traces.

A connector which mechanically conforms to mating contours for connection (a "compliant connector") is disposed for contact with the exposed circular traces. As the compliant connector is mounted through and in the base casting near the motor mount, the spindle motor and PCB may be assembled to the base casting causing the exposed traces to make contact with electrical contacts of the connector. Thus, the spindle motor is in electrical contact with the connector. The opposite side of the connector is attached to the driver board (drive circuitry), which is located below the base, external to the drive volume.

As disc drive assemblies are well known in the art, in order to avoid confusion while enabling those skilled in the art to practice the present invention, this specification omits many details with respect to the disc drive assembly.

Figure 4:
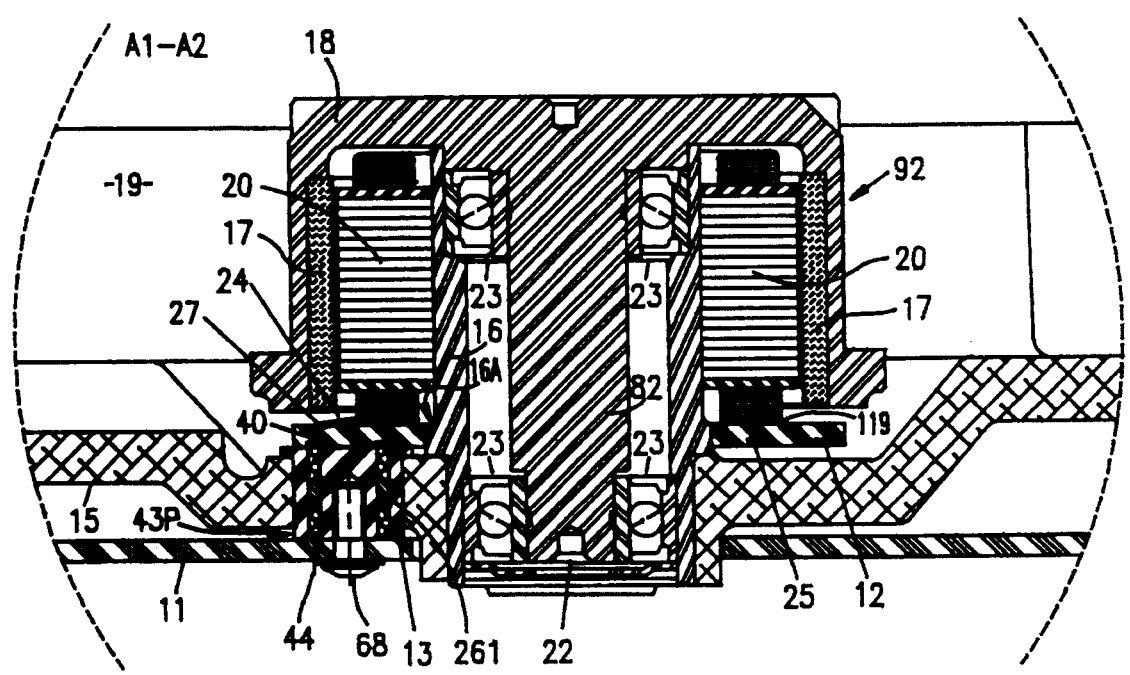
FIG. 4 is a cross-section of a portion of a hard disc drive of a preferred embodiment of the present invention.

Referring to FIG. 4, there is shown a cross-section of a preferred embodiment of a portion of hard disc drive assembly 26 in accordance with the present invention. Spindle motor assembly 92 is a rotating shaft motor, as opposed to a stationary shaft motor.

In the preferred embodiment, connector 43P is a cylindrical, compliant connector. Connector 43P extends through base 15 in near proximity to where spindle motor assembly 92 is mounted to base 15. Connector 43P may be sealed to drive base 15 with adhesive. Button contacts 44 are employed in housing 13 of connector 43P along with conductors 261 and screw 68. Screw 68 is to ensure reliable contact between connector 43P and PCB driver board 11. Connector 43P electrically couples spindle motor assembly 92 to driver board 11.

Support flange 12 is attached to stator assembly 20 with adhesive 119. Adhesive 119 may be used to fill any gap resulting between stator assembly 20 and support flange 12. Alternatively, flange 12 may be attached to outer diameter 16A of stator sleeve 16 with adhesive 119, and thus flange 12 need not be bonded to stator windings.

Rotor 18 is mounted on spindle bearing 22 of spindle motor assembly 92. Attached to rotor 18 is magnetic assembly 17. As is known, magnetic assembly 17 may comprise a permanent magnet. Stator assembly 20 is fitted to stator sleeve 16 and support flange 12. Rotor 18 and rotor shaft 82 revolve with respect to stator assembly 20 and stator sleeve 16. Accordingly, bearing assemblies 23 are provided for this rotational movement. Operation of electric motors is well known in the art of the present invention, and thus a detailed description of such operation will be omitted.

Figure 5:
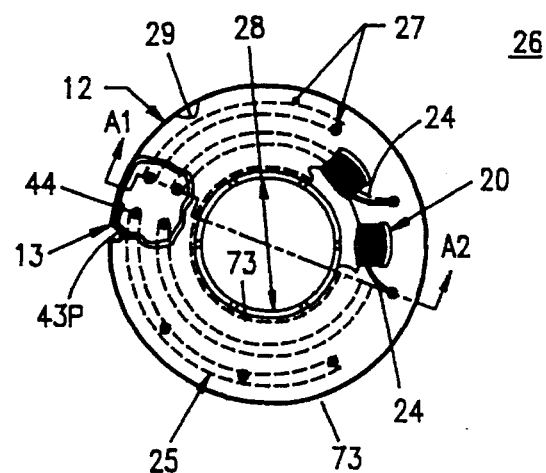
FIG. 5 is a top exposed view of the motor assembly of FIG. 4.

Referring to FIG. 5, a top view of a spindle motor assembly of hard disc drive assembly 26 is shown. It should be understood, that many details have been omitted from FIG. 5 to more particularly describe a top view of support flange 12.

Referring to FIG. 5 in conjunction with FIG. 4, support flange 12 is a two sided PCB. Reinforced or unreinforced thermoplastic may be used for construction of support flange 12. Support flange 12 includes PCB traces 25 and solder pads 27. Solder pads 27 are provided for connecting stator wires 24 to pads 27. Solder pads 27 are disposed on an upper surface of flange 12. Wires 24 are typically connected to solder pads 27. Solder pads 27 are electrically connected to traces 25 by conductors 40 (e.g., vias, or leads; the term via means a plated-through hole). Traces 25 are electrically connected to button contacts 44. Thus, in the preferred embodiment of the present invention, specific orientation is provided for electrical interface of stator wires 24 to pads 27 on the topside of flange 12, while non-specific (360 degree) orientation is provided on the underside of flange 12 with exposed traces 25 for electrical interface with button contacts 44.

In the preferred embodiment of the present invention, four button contacts 44 correspond to four traces 25 on support flange 12 for a three phase spindle motor. However, it should be understood that the number of contacts and traces will depend on the number of phases as provided with a stator assembly and the type of grounding employed or not employed. In accordance with the present invention, fewer or more contacts and traces may be used, depending on the number of phases of the motor and the type of grounding employed or not employed. The present invention is useful with motors having one or more phases. Additionally, one or more connectors may be used.

As is known in the art of PCBs, film 29 may be deposited for protection and isolation of traces 25. Also, inner and outer diameters of flange 12 may include a coating 73 (e.g., with the same material as used for traces 25) to limit contamination. Coating 73 is a deposited "trim" around inner and outer diameter edges of flange 12.

Solder pads 27 are located outside stator laminations, as shown in FIG. 5. This is to allow easy access for soldering of stator wires 24 to pads 27. In this manner, soldering may be done either manually or automatically. Also, conductors 40 are vias in the preferred embodiment.

In order to understand a more generalized case in accordance with the present invention, it should be noted that any of a variety of connectors may be disposed in base 15 (shown in FIG. 4). For example, rather than button contacts, spring contacts or compliant pin contacts may be used. Such connectors may also include non-compliant connectors. Moveover, the shape of connector 43P (shown in FIG. 5) may be varied.

Figure 20:
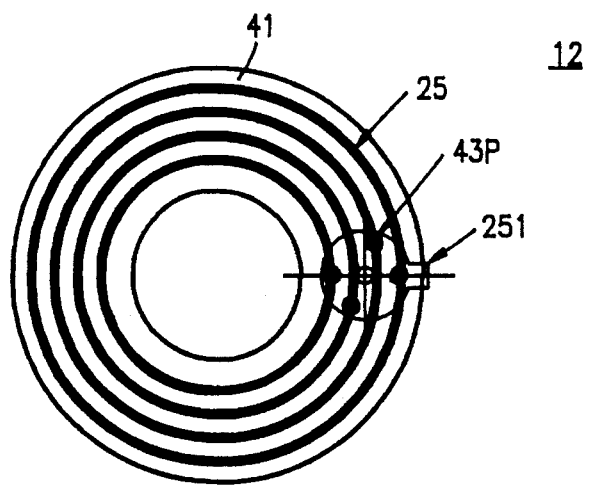
FIG. 20 is a plan view of a PCB flange for a cylindrical connector connection in accordance with the present invention.
Figure 21:
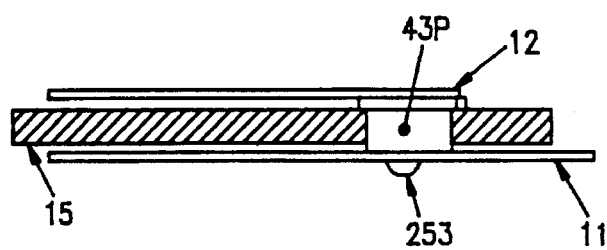
FIG. 21 is a cross-sectional view of a portion of a hard disc drive having a cylindrical connector in accordance with the present invention.
Figures 22, 23, 24:
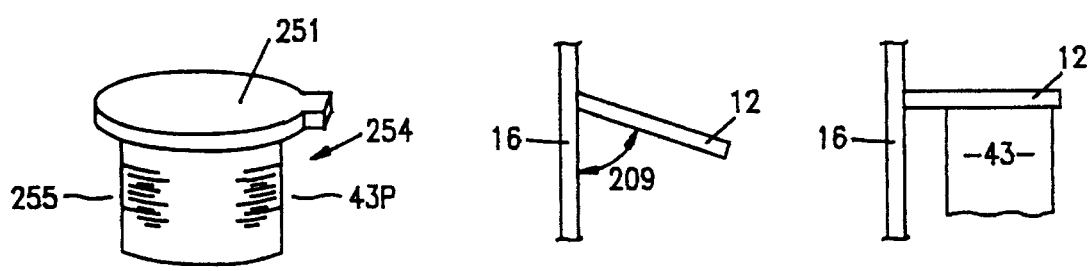
FIG. 22 is a perspective view of a cylindrical connector in accordance with the present invention.
FIGS. 23 and 24 are side views of a biased flange in accordance with the present invention.

Referring to FIG. 22, an enlarged view of a cylindrical connector 43P in accordance with the preferred embodiment of the present invention is shown. Connector 43P has a cylindrical shape 255 and a rounded top section 251. Additionally, lip 254 may be used to seal a drive volume with insertion of connector 43P to base 15 (shown in FIG. 21). FIG. 21 shows a cross-section of assembly of flange-to-connector-to-base in accordance with the present invention. An interference fit may be employed for mating connector 43P to base 15 for sealing drive volume 19 (shown in FIG. 4). Compression fastener 253 may be employed for holding connector 43P. Optionally, adhesive may be used instead of or in addition to compression fastener 253. FIG. 20 is a bottom view of the flange 12 in accordance with the present invention. As shown, exposed traces 25 on bottom surface 41 of flange 12 are provided for non-specific orientation.

First Alternate Embodiment

Figure 6:
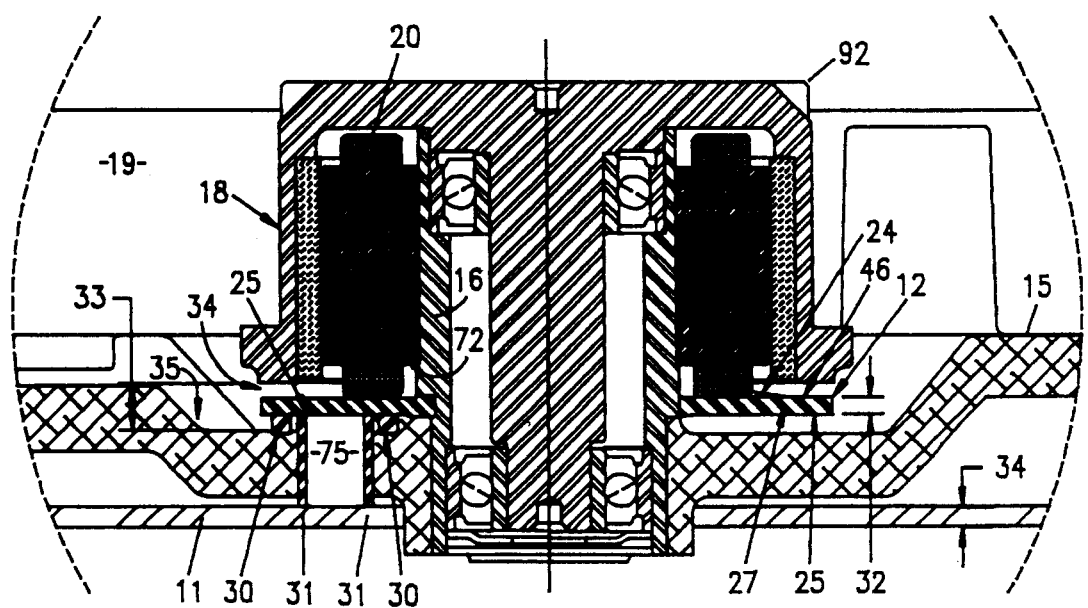
FIG. 6 is a cross-section of a portion of a first alternate embodiment of a hard disc drive in accordance with the present invention.

Referring to FIG. 6, a cross-section of an alternate embodiment of hard disc drive volume 19 is shown. As shown, support ledge 72 is provided with sleeve 16 for maintaining stator assembly 20 in place. As shown, support flange 12 comprises solder pads 27 for connecting to stator wires 24.

An elastomeric connector element 75 for connector 43P may be used instead of button contacts 44 (shown in FIG. 4). Elastomeric connector element 75 is disposed in dielectric sheathing material 31 mounted in drive base 15. Such elastomeric connectors are provided by Elastomeric Technologies, Inc., of Hatboro, Pa.

Figure 7:
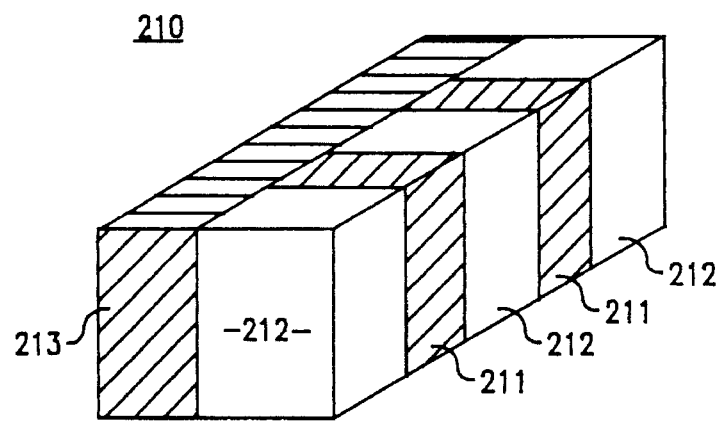
FIG. 7 is a perspective view of an elastomeric type connector of the prior art.

Referring to FIG. 7, a layered-type elastomeric element 210 of the prior art is shown. Elastomeric element 210 includes: support/insulation layer 213 (typically made of solid or foam silicone), alternating conductive layers 211, and alternating non-conductive layers 212.

Referring again to FIG. 6 with continuing reference to FIG. 7, conductive layers 211 are in electrical contact with exposed traces 25. Exposed traces 25 are connected to pads 27 through conductors 40. Elastomeric connector element 75 may be potted to isolate it to mitigate against contamination in volume 19. Also, to maintain a sealed drive volume 19, seal 30 is provided.

Distance 33 between bottom region 34 of rotor 18 to region 35 of drive base 15 is approximately 1.836 mm.; thickness 34 of driver PCB 11 is approximately 0.8128 mm.; and thickness 32 of support flanges 12 is approximately 0.635 mm.

Second Alternate Embodiment

Figure 8:
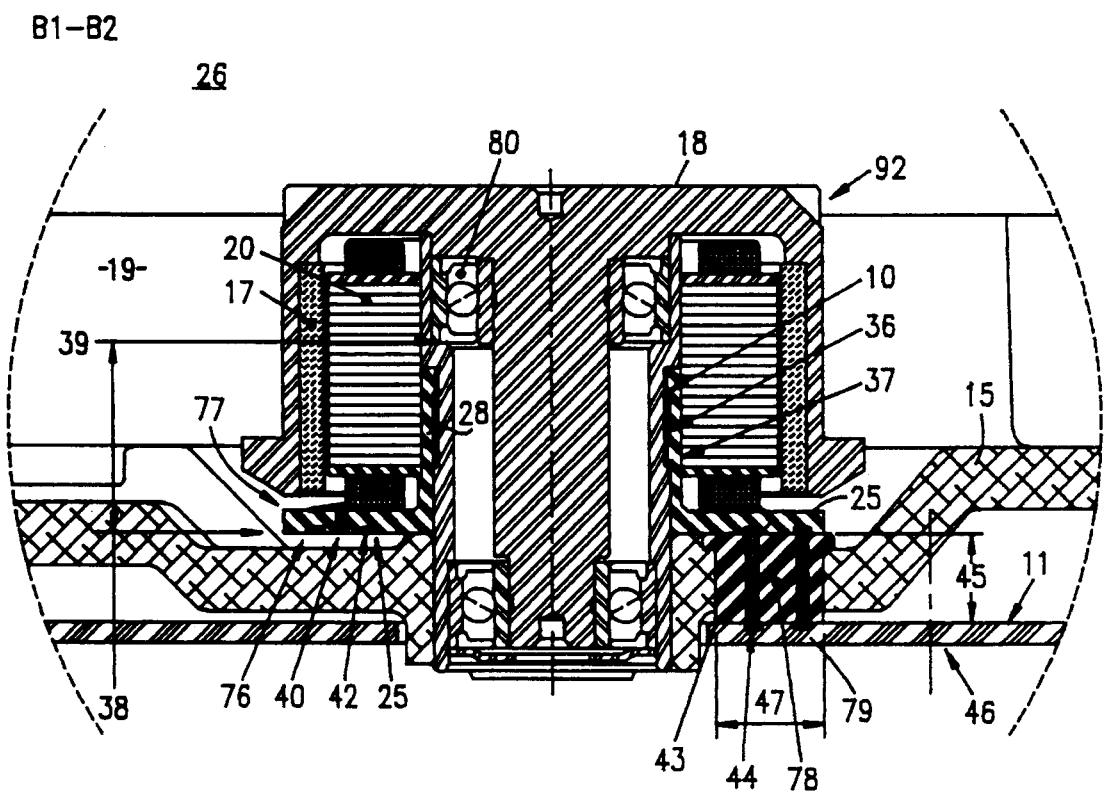
FIG. 8 is a cross-section of a portion of a second alternate embodiment of a hard disc drive in accordance with the present invention.

Referring to FIG. 8, a cross section of a portion of drive volume 19 is shown. Support flange assembly 42 may be a molded part having circuits plated and etched, or a plated pattern, thereon, or an overmolded part having circuits embedded therein. An overmolded or molded part may be made of a thermoplastic resin or other plastic material. Tolerance ring 10 is used to provide friction retention for holding stator assembly 20 in place. Thus, friction retention locations 36 and 37, namely, the outer and inner surfaces, respectively, of flange wall 28 are for holding stator assembly 20 in place. Flange wall 28 may be notched for expanding with pressure from tolerance ring 10.

By molding or overmolding support flange assembly 42, tighter dimensional tolerances may be achieved. Also, in an overmolded support flange assembly 42, circuit portions are part of the structure of hard disc drive assembly 26.

As mentioned above, assembly 42 may be plated with conductive material and subsequently etched, or, alternatively, may be plated with a desired pattern. The pattern may comprise traces on both upper surface 77 and lower surface 76 of assembly 42. Conductors 40 are for electrically conducting through the thickness of assembly 42.

Figure 9:
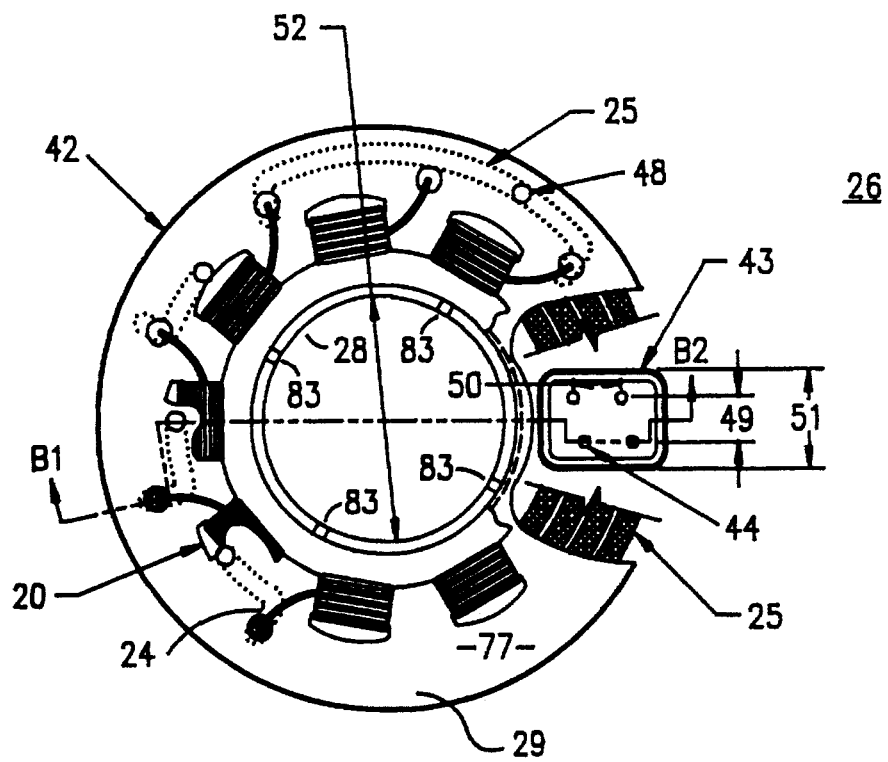
FIG. 9 is a top exposed view, partly broken away, of the motor flange assembly of FIG. 8.

Referring to FIG. 9, a top view of a spindle motor assembly of hard disc drive assembly 26 is shown. Referring to FIG. 8 in combination with FIG. 9, four wire button contacts 44 disposed in molded plastic connector housing 78 are aligned with traces 25 on assembly 42 and contacts 79 on driver PCB 11. As shown, connector 43 may be sealed into driver base 15, typically made of aluminum. Additionally, an optional screw may be added to location 46 for mounting of driver PCB 11 to base 15 to improve electrical contact between traces 25 and button contacts 44. Stator assembly 20 and magnetic assembly 17 may be raised inside the motor envelope created by rotor 18 to provide additional space. (Notably, connector 43 is distinct from connector 43P. Connector 43P is cylindrical, whereas connector 43 is rectangular.)

Distance 38 between bottom region 39 of top bearing assembly 80 and bottom region 41 of assembly 42 is approximately 6.95 mm.; connector height 45 is approximately 3.378 mm.; and connector width 47 is approximately 4.05 mm.

Traces 25 are provided with solder pads 27. Vias 48 extend to traces 25 on bottom surface 41 of assembly 42. This allows for electrical conduction through the thickness of assembly 42. Additionally, as shown in cut-a-way, traces 25 are circular. Traces 25 may be copper flash-plated with tin or gold. Four traces 25 are for alignment with four wire button contacts 44 of connector 43. Traces 25 are also exposed, which allows molded support flange assembly 42 to be oriented anywhere within a 360 degree axial rotation. This significantly simplifies alignment during assembly, as the circular circuit pattern provided allows spindle motor assembly 92 to be installed to base 15 without need to specifically orient the former relative to a position of connector 43.

Stator windings are terminated with stator wires 24 to solder pads 27 on top surface 77 of assembly 42. Each phase of stator assembly 20 may be connected to a corresponding circular trace 25 of assembly 42 by via 48. In the preferred embodiment of the present invention, three of the traces are employed for each phase of a three phase motor, and a fourth trace is for a common ground. However, a motor with any number of phases may be used when practicing the present invention.

Stator assembly 20 may be oriented relative to solder pads 27. By using vias 48 and traces 25, solder pads 27 may extend outside of stator assembly 20 for accessibility to manual or automated soldering tooling. Wall 28 of assembly 42 may be compressed between tolerance ring 10 and stator assembly 20. Inside diameter 52 of assembly 42 may be press fit over stator sleeve 16 from below. Notches 83 may be provided in flange wall 28 for press fitting to stator sleeve 16.

Typical dimensions of connector 43 include distance 50, between button contacts 44, of approximately 1.77 mm., and distance 49, between pairs of button contacts 44, of approximately 1.27 mm. Typical connector width 51 is approximately 4.19 mm.

Figure 10:
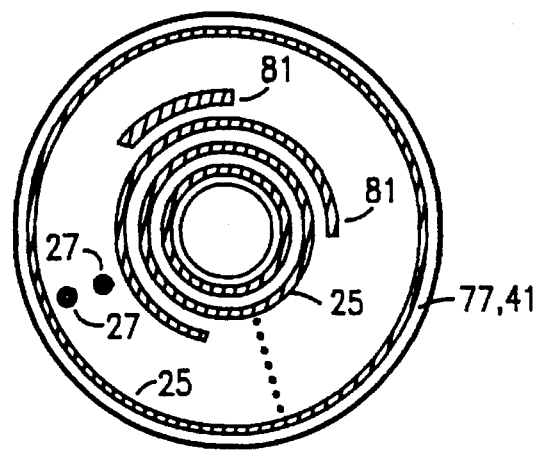
FIG. 10 shows patterns for circuit traces and pads which may be used on a top and/or bottom surface of a flange in accordance with the present invention.

Specific, Less Specific and Non-Specific Orientations of the Flange to the Stator Assembly and/or the Connector Referring to FIG. 10, exposed traces 25 on bottom surface 41 or top surface 77 of flanges 12 and 42 are illustratively shown. Additionally, it should be understood that a PCC 53 may be made to include traces for less specific or non-specific orientation. As indicated, traces 25 may comprise as many traces as desired depending on the number of phases and grounding scheme employed in operation of a spindle motor assembly. Exposed traces 25 allow orientation anywhere within a 360° rotation. This allows for non-specific orientation to a stator assembly and/or a connector.

Alternatively, traces 25 may shaped as arcuate segments such as traces 81 for less specific orientation. Arcuate-segment-shaped traces 81 are for providing connector contact within a predetermined angular range, but at orientations outside such a range, electrical contact cannot be provided.

Therefore, it should be understood that traces may be disposed on a top surface, a bottom surface, or top and bottom surfaces of a support flange in accordance with the present invention for less specific and/or non-specific orientations. Traces may be omitted in part or whole for partially or wholly specifically orienting: stator wires to a top surface of a support flange, and/or connector contacts to a bottom surface of the support flange. Solder pads 27 may be provided for specific orientation. Thus, the present invention provides a variety of options for orientation of a spindle motor assembly to a connector.

Third Alternate Embodiment

Figure 11:
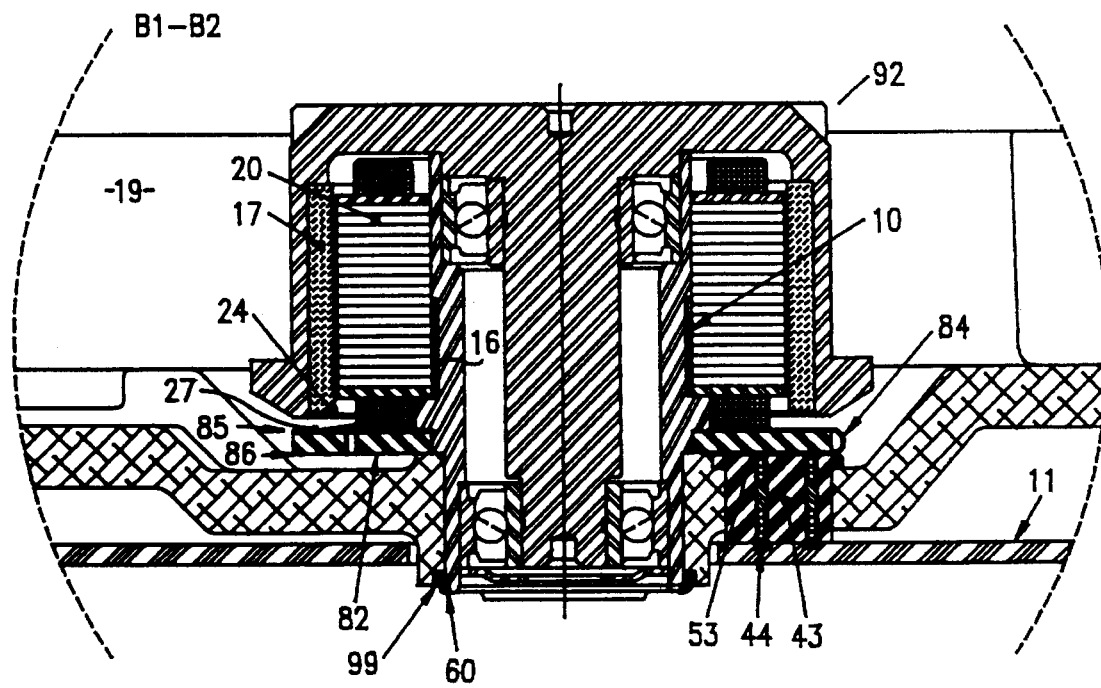
FIG. 11 is a cross-section of a portion of a third alternate embodiment of a hard disc drive in accordance with the present invention.

Referring to FIG. 11, a cross-section of hard disc drive volume 19 is shown. PCC 53 is coupled to support flange 82. PCC 53 may be bonded to one or both sides of support flange 82.

Figure 12:
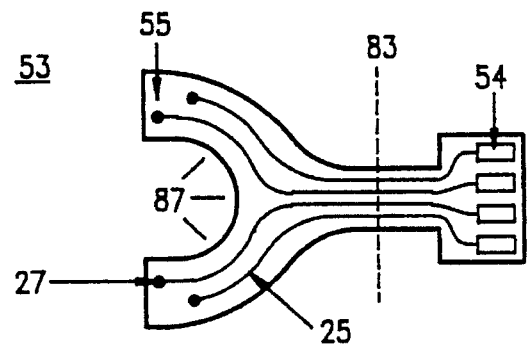
FIG. 12 is a top view of a PCC in accordance with the present invention.

Referring to FIG. 12 with continuing reference to FIG. 11, a top view of PCC 53 is shown. As shown, PCC 53 comprises a substrate 55, traces 25, solder pads 27, and connector interface pads 54. Solder pads 27 are provided on PCC 53 for attachment of stator wires 24. Dash line 83 denotes a fold line for PCC 53 corresponding to location 84. PCC 53 may be bonded to carrier ring 60 and located on top surface 85 of support flange 82. PCC 53 has a curved contour 87 for conforming about stator sleeve 16.

Connector interface pads 54 are shown with the contact surface side up. Therefore, when PCC 53 is bent around support flange 82 at location 84, connector interface pads 54 are aligned with button contacts 44. This is for providing electrical continuity between stator assembly 20 and driver PCB 11. While connector interface pads 54 have been shown in a series pattern, it should be understood that they may be staggered or otherwise modified for mating with button contacts 44. PCC 53 is bent around flange 82 such that solder pads 27 remain on surface 85 of flange 82, and that connector interface pads 54 are located on surface 86 of support flange 82.

However, PCC 53 need not be bent around support flange 82. Rather PCC 53 may be disposed on one side of support flange 82 for mating with a PCB disposed on the other side of support flange 82. Thus, PCC 53 may be folded or not folded. Also, PCC 53 may comprise exposed traces 25 for less specific or non-specific orientation as previously described herein with reference to FIG. 10.

Alternative Mountings

Referring to FIGS. 11 and 13–19, a plurality of alternative means for connecting spindle motor assembly 92 to drive base 15 are described.

In FIG. 11, laser weld 60 may be employed for holding a spindle motor to a base. However, for laser welding, it is preferred that base 15 and sleeve 16 be made of similar materials. Alternatively, ring 99 of a material similar to sleeve 16 may be cast in base 15. Presently, as sleeve 16 is made of steel, and base 15 is made of an aluminum alloy, ring 99 is made of steel.

Figure 13:
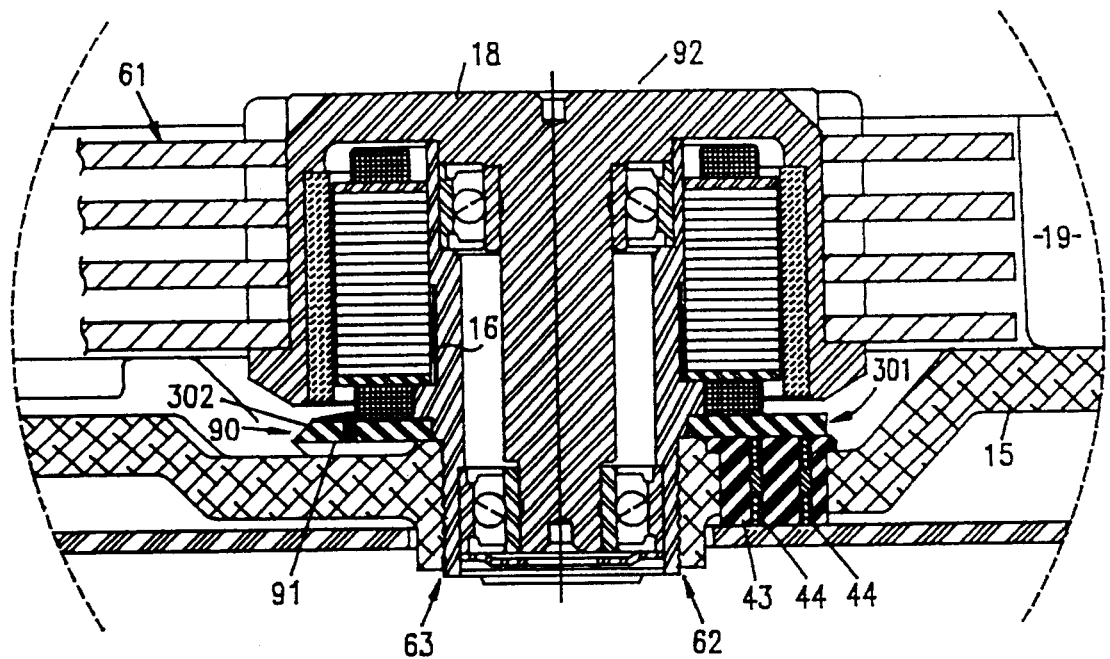
FIGS. 13–19 are cross-sectional views of portions of alternative features for a hard disc drive in accordance with the present invention.
Figure 14:
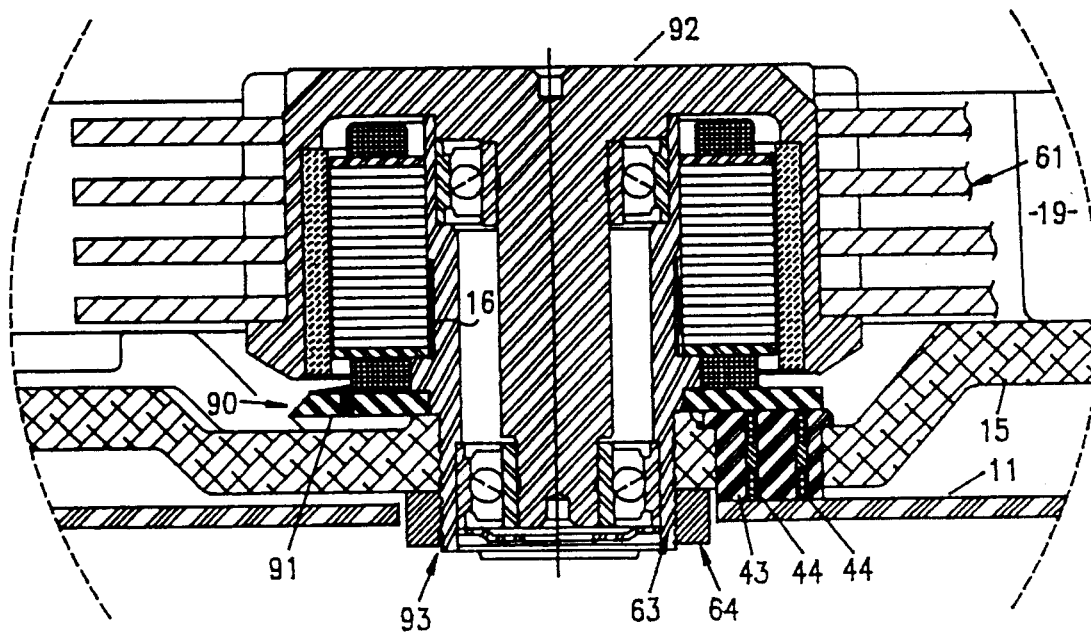

Referring to FIGS. 13 and 14, threads 62 and 63 may be provided to drive base 15 and rotating shaft spindle motor assembly 92 for attachment by screwing assembly 92 to drive base 15. Alternatively, a nut 64 having threads 93 may be used for mating with threads 63 of assembly 92. Electrical connection is made as assembly 92 support flange 90 bottom side 91 compresses button contacts 44 on connector 43 with the screwing of assembly 92 to base 15 or nut 64. Thus, assembly 92 may be removed from base 15 without removing disc 61 from assembly 92.

Figure 15:
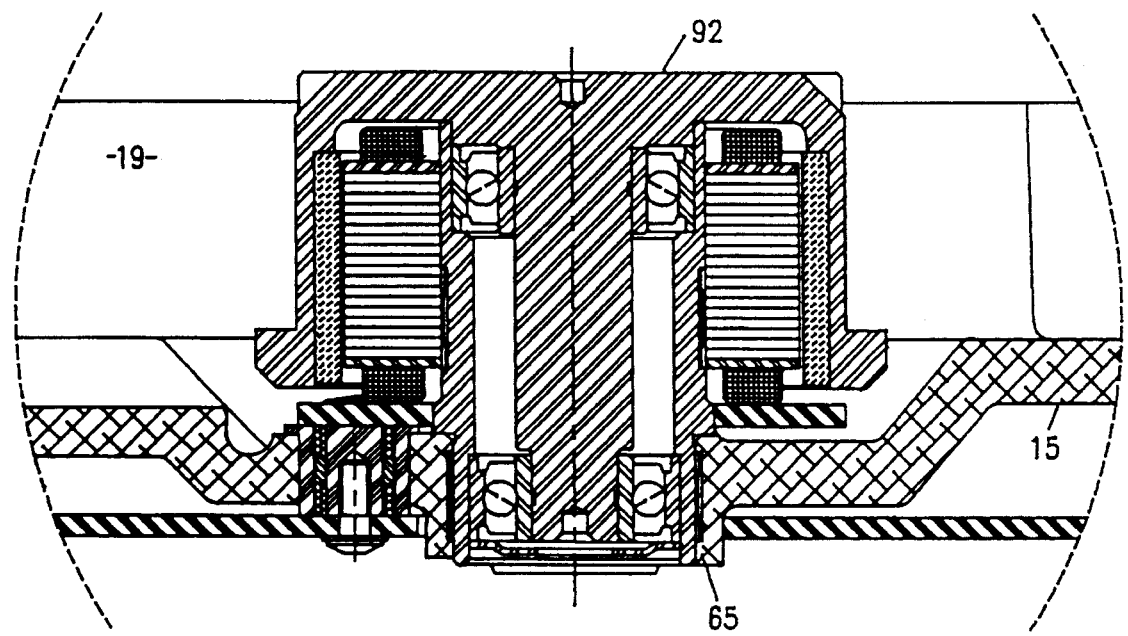

In FIG. 15, a tolerance ring 65 is used for connecting drive base 15 to spindle motor assembly 92 with friction contact.

Figure 16:
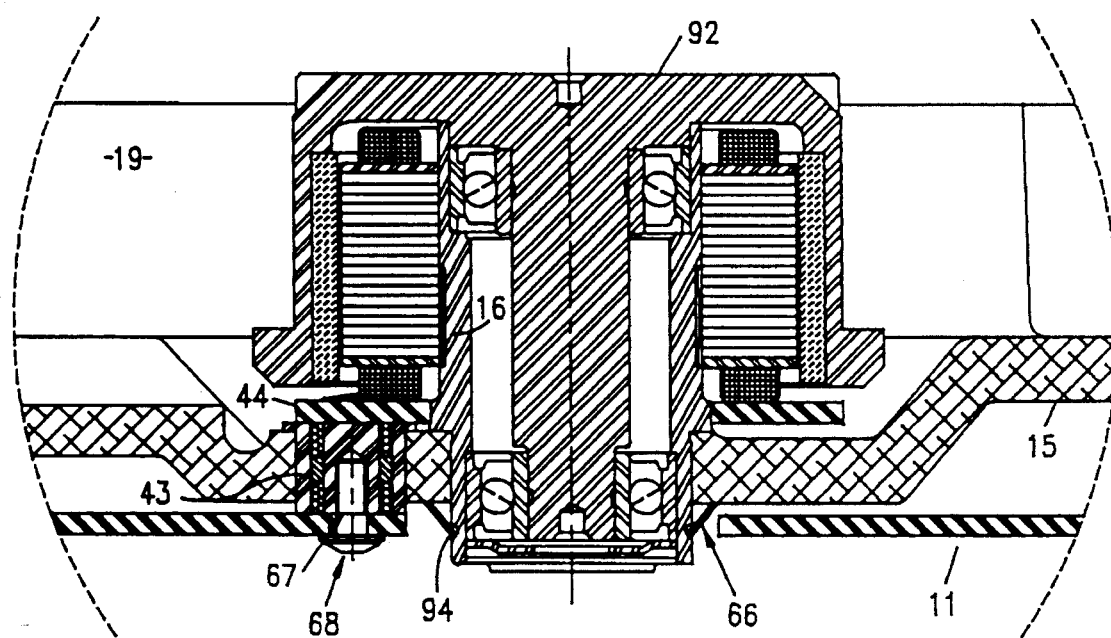

In FIG. 16, springlock washer 66 is inserted into notch 94 of stator sleeve 16 for holding drive base 15 to spindle motor assembly 92. Also shown is an alternative method of locking button contacts 44 to driver PCB 11. As shown, threaded recess 67 is provided for mating with screw 68 for securing driver PCB 11 to connector 43.

Figure 17:
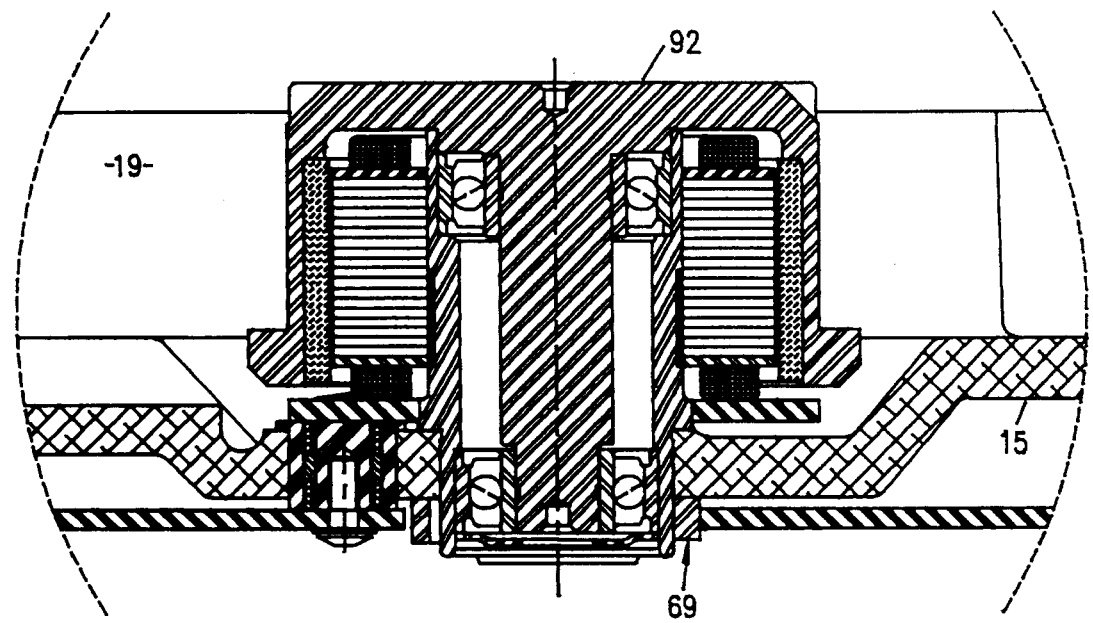

Referring to FIG. 17, a heat shrink clamp 69 may be employed to secure spindle motor assembly 92 to drive base 15.

Figure 18:
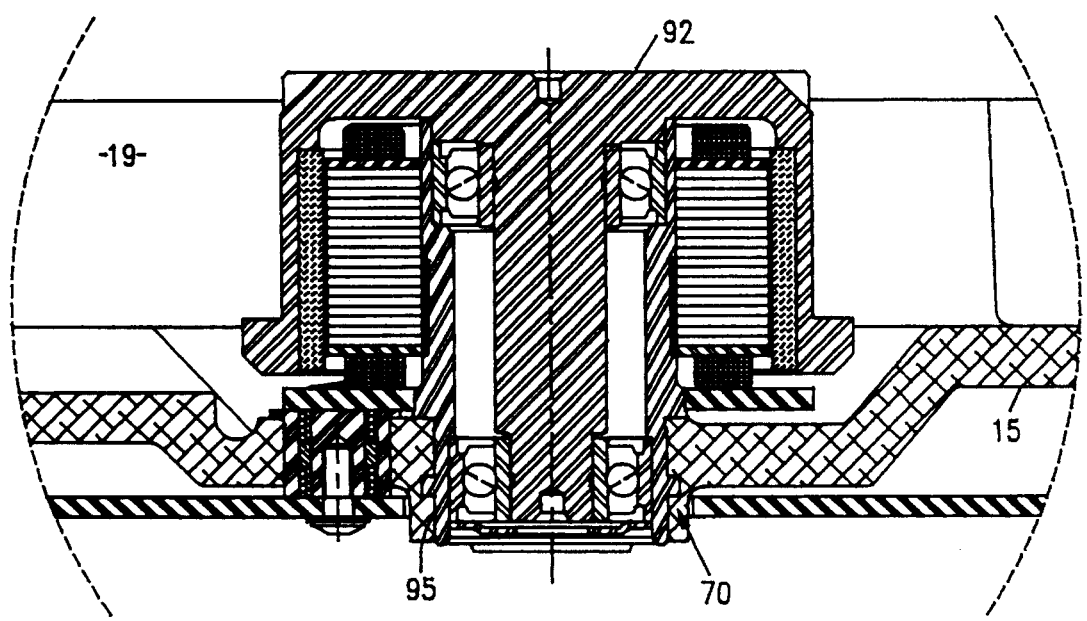

In FIG. 18, a bayonet retainer 70 is positioned in notch 95 of drive base 15 for holding spindle motor assembly 92 secure to base 15.

Figure 19:
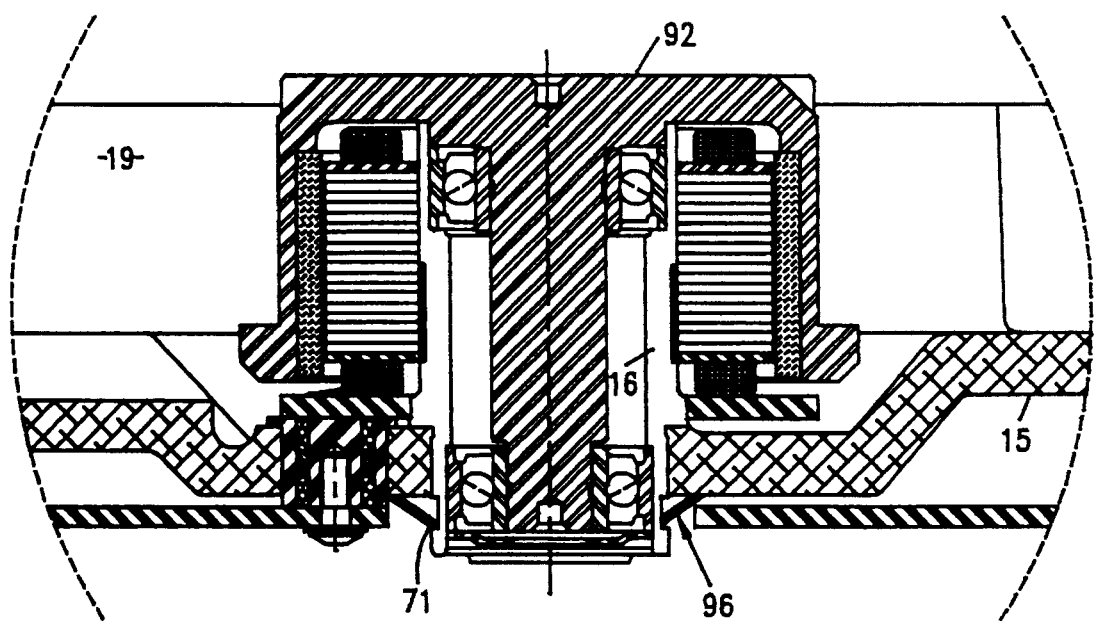

Referring to FIG. 19, "C"-clip retainer 71 is employed at ledge 96 of stator sleeve 16 for securing drive base 15 to spindle motor assembly 92.

Alternative Flange Assemblies

Referring to FIG. 13, modified support flange 90 is shown. Support flange 90 may have a sloped edge 302 for clearance for operation of rotor 18. Alternatively, diameter of support flange 90 may be reduced such that edge 301 is within an inside diameter of rotor 18, so as not to interfere with operation of rotor 18.

Referring to FIGS. 23 and 24, flange 12 may be biased at angle 209 with respect to sleeve 16. When mated with connector 43, flange 12 conforms to the mating surface of connector 43. Biasing flange 12 increases the reliability of electrical contact. The spring rate of flange 12 may be designed to be satisfactory in the existing ambient environment, taking into account shock and vibration. The spring rate of flange 12 depends on stiffness (thickness) and bias angle 209 of flange 12, as well as on the mass of the parts. It should be understood that the spring rate of flange 12 is designed to be great enough to maintain contact, while not so great as to cause significant deformation of the parts.

Working Model

A working model of a rotating shaft spindle motor and PCB flange in accordance with the preferred embodiment was constructed in accordance with the principles of the present invention. The tolerances on end turns of the working model were greatly relaxed as compared with prior art rotating shaft spindle motors. The electrical interface connections of the working model do not interfere with motor operation. These features and advantages, taken with a non-specific orientation of the motor-to-connector (the connector being disposed in the base), substantially simplified assembly of the working model.

The present invention has been particularly shown and described with respect to certain preferred embodiments and features thereof. However, it should be readily apparent to those of ordinary skill in the art that various changes and modifications in form and detail may be made without departing from the spirit and scope of the inventions as set forth in the appended claims. The inventions illustratively disclosed herein may be practiced without any element which is not specifically disclosed herein.

We claim:

1. In a hard disc drive assembly including a base, a spindle motor, and a driver board, the spindle motor including a rotor, a stator, and a stator sleeve, the stator including coupling wires, an apparatus comprising:

a support flange located below the stator, the support flange being bonded to an outer diameter of the stator sleeve; the support flange including a circuit, the coupling wires for mating with solder pads on the support flange, the solder pads being in electrical continuity with traces of the circuit; and a connector having contacting elements for electrical continuity mating with the traces of the circuit and with the driver board, the connector being disposed in and through the base;

the contacting elements of the connector being put into electrical continuity with the traces of the circuit by mechanical mounting of the spindle motor to the base;

the support flange being connected to the stator sleeve at a predetermined bias angle, the bias angle being other than ninety degrees to an axis of rotation of the spindle motor.

* * * * *